June 13, 1933.  F. LUKER  1,913,554
ARMORED VEHICLE CONSTRUCTION
Filed Sept. 22, 1930  3 Sheets-Sheet 1
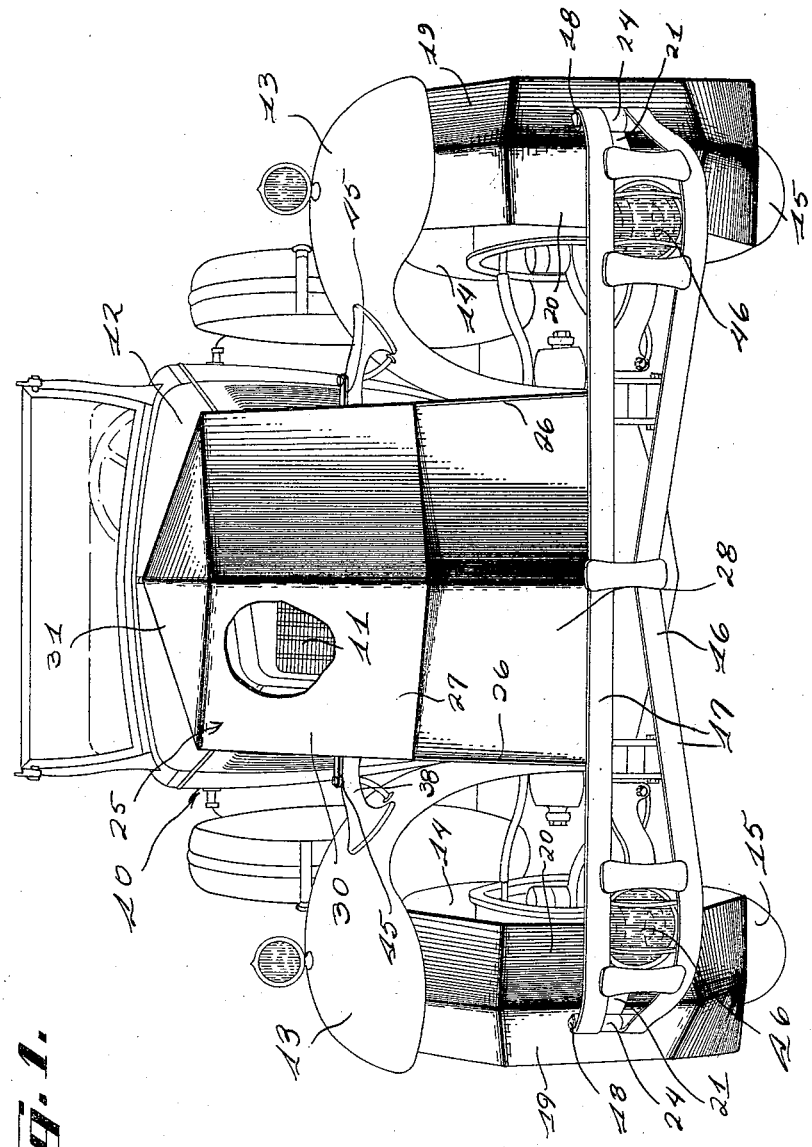

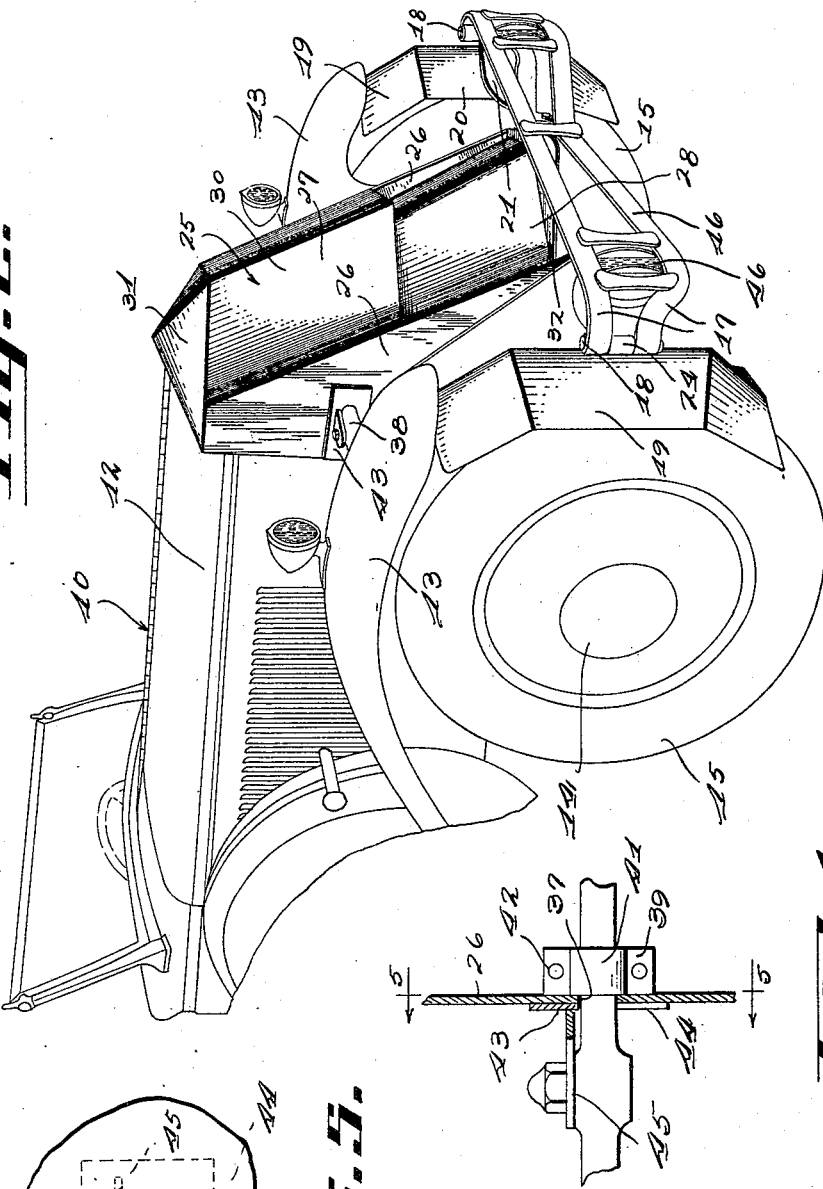

June 13, 1933.  F. LUKER  1,913,554
ARMORED VEHICLE CONSTRUCTION
Filed Sept. 22, 1930   3 Sheets-Sheet 3
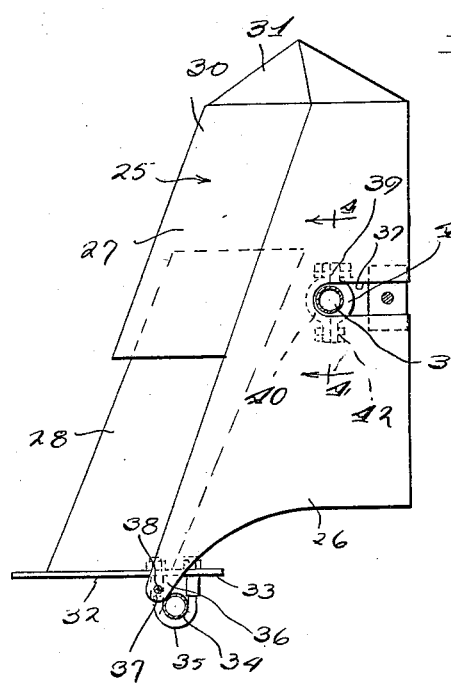
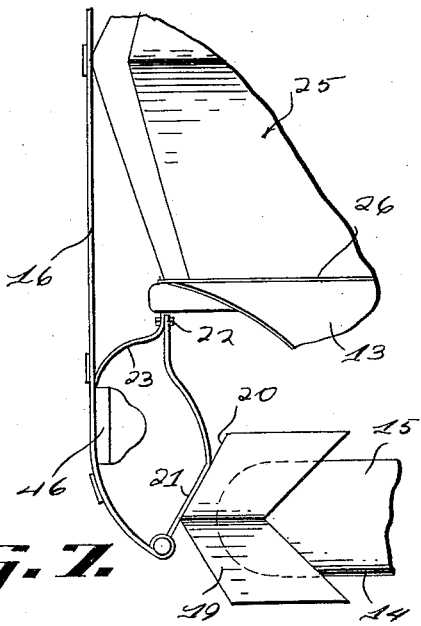
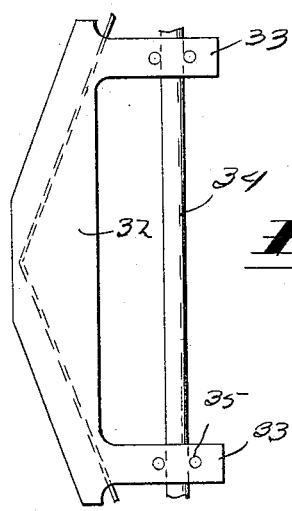
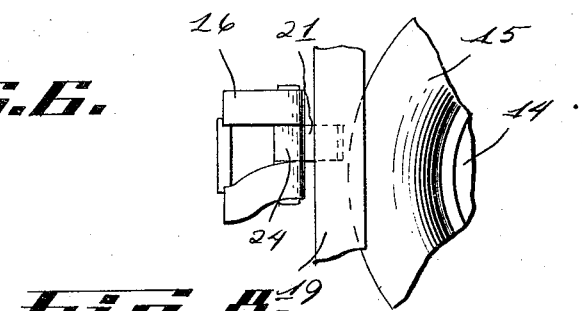
INVENTOR
Fred Luker
BY Whittemore Hulbert
Whittemore & Belknap
ATTORNEYS Patented June 13, 1933

1,913,554

UNITED STATES PATENT OFFICE

FRED LUKER, OF DETROIT, MICHIGAN, ASSIGNOR TO HUPP MOTOR CAR CORPORATION, OF DETROIT, MICHIGAN, A CORPORATION OF VIRGINIA

ARMORED VEHICLE CONSTRUCTION

Application filed September 22, 1930. Serial No. 483,689.

This invention relates generally to vehicles and more particularly to armored vehicles especially designed for police use.

One of the principal objects of this invention is to provide a protective coating of armor for the front end of a motor vehicle constructed of metallic plates of sufficient gauge to prevent projectiles such as bullets and the like from passing therethrough and injuring the vital parts of the vehicle.

Another advantageous feature of this invention is to provide a metallic shield for the radiator unit which not only protects the radiator from injury, but provides for efficient cooling of the same.

A further object of this invention is to provide armored plates for the pneumatic tires and radiator unit of the vehicle which may be readily applied to the latter without appreciably altering the construction of the vehicle and as a consequence does not materially add to the cost of the same.

With the foregoing as well as other objects in view, the invention resides in the particular construction of the parts and the novel manner in which the same are secured to the vehicle. The foregoing will be made more apparent as this description proceeds, especially when considered in connection with the accompanying drawings, wherein:

Figure 1 is a front elevational view of a motor vehicle armored in accordance with the present invention.

Figure 2 is a fragmentary perspective view of the construction shown in Figure 1.

Figure 3 is a side elevational view partly in section illustrating the manner in which the armor for the radiator unit is attached to the vehicle.

Figure 4 is a sectional view taken substantially on the line 4—4 of Figure 3.

Figure 5 is a sectional view taken on the line 5—5 of Figure 4.

Figure 6 is a bottom plan view of the construction shown in Figure 3.

Figure 7 is a fragmentary plan view of the front end portion of the vehicle showing the manner in which the armored plates for the pneumatic tires are supported.

Figure 8 is a side elevational view of the construction shown in Figure 7.

Referring now to the drawings, it will be noted that there is illustrated in Figures 1 and 2 a motor vehicle 10 of conventional design having a radiator unit 11 supported upon the chassis frame adjacent the forward end thereof in advance of the motor compartment 12. The radiator unit 11 is constructed in accordance with the usual practice for cooling the water flowing through the cooling system. Arranged upon opposite sides of the motor compartment in the usual way are the front fenders 13 adapted to extend over the wheels 14 equipped with the pneumatic tires 15. Secured to the extreme forward ends of the chassis frame is a suitable bumper 16 comprising vertically spaced bars 17 extending transversely of the vehicle and connected together in spaced relation at the opposite ends thereof by means of the vertically extending pins 18.

In order to render a vehicle of the general type outlined above practical for police use, it is desirable that some means be provided for protecting the vital parts of the vehicle such as the radiator unit and pneumatic tires from injury by bullets or other projectiles directed toward the same. The present invention contemplates accomplishing the foregoing results by supporting armored plates upon the vehicle in advance of front pneumatic tires and radiator unit.

In detail, the pneumatic tires of the vehicle are protected by a pair of metallic plates 19 positioned in advance of the tires in direct alignment therewith and having a sufficient thickness to prevent the passage of a projectile or bullet therethrough. The plates 19 are substantially V-shaped, as shown in Figure 2, with the apex of the V's arranged forwardly and the legs of the V's inclined rearwardly and outwardly therefrom. The upper ends of the plates 19 are preferably inclined rearwardly and upwardly and extend beneath the fenders 13, while the lower ends of the plates 19 are inclined rearwardly and downwardly and terminate as close to the road as is consistent for proper road clearance. By imparting the aforesaid contour to the plates 19, the latter will deflect the projectiles striking the same away from the pneumatic tires.

As shown particularly in Figure 7, the armored plates 19 are carried by the front bumper 16. In order to efficiently connect the plates 19 to the front bumper with the minimum number of parts, the inner inclined legs 20 of the plates 19 are welded or otherwise suitably secured to the substantially flat bars 21 intermediate the ends thereof. The inner ends of the bars 21 are secured as at 22 to the arms 23 of the bumper while the outer ends thereof projecting beyond the plates 19 and terminating in sleeve-like portions 24 adapted to sleeve over the pins 18 and engage the same intermediate the spaced bars 17. The arrangement is such that the sleeve-like portions 24, in addition to rigidly securing the bars 21 to the bumper, also function as a spacer for the bumper bars 17.

In order to protect the radiator unit 11 from injury and at the same time provide for efficient cooling of the same, I provide a hood 25 of sufficient dimension to substantially enclose the radiator unit as clearly shown in Figure 2 of the drawings. The hood 25 is formed of a pair of side plates 26 arranged upon opposite sides of and adapted to overlap the radiator unit 11 and having the front edges thereof inclined downwardly and forwardly from the upper end to a point adjacent the front end of the chassis frame. Secured to the front edges of the plates 26 is a plurality of plates 27 having the opposite side edges thereof welded or otherwise suitably secured to the side plates 26 and inclined in a direction substantially corresponding to the front edges of the side plates. The front plates 27 are preferably substantially V-shaped in cross-section and the adjacent edges of the plates 27 are arranged in overlapping relation and are spaced from each other, as clearly shown in Figure 3, to provide for the passage of air through the hood to the radiator unit. In detail, the upper edge of the lowermost plate 28 extends below the lower edge of the intermediate plate 29 in spaced relation thereto, while the upper edge of the plate 29 extends below the lower edge of the top plate 30 in spaced relation thereto. The extent of overlapping of the plates is such that there is no possibility of a projectile finding its way through the passages formed by the plates. The top plate 30 and side plates 26 are further provided with a top section 31 adapted to incline rearwardly and upwardly from the plate 30 hereinbefore set forth. From the foregoing it will be seen that the hood 25 is also shaped to deflect any projectiles striking the same away from the vehicle.

The hood 25 is further provided with a bottom plate 32 having rearwardly extending arms 33 secured intermediate the ends thereof to the tubular crossbrace 34 for the chassis frame by means of the U bolts 35. The side plates 26 of the hood 25 are provided with downwardly projecting extensions 36 having openings 37 therein for receiving the front shackle bolts 38 with the result that the latter, in addition to performing their usual function, further serve to secure the hood in place. As shown particularly in Figures 3 and 4, the side plates 26 are also provided with rearwardly opening slots 37 adapted to receive the conventional tubular fender braces 38 extending from opposite sides of the radiator unit to the fenders. The side plates 26 are secured to the tubular fender braces by means of the two-part brackets 39 having one part 40 thereof welded or otherwise suitably fastened to the inner surface of the side plates 26 and having a semi-circular intermediate portion adapted to embrace the front sides of the tubular fender braces. The cooperating bracket part 41 is adapted to be secured to the part 40 by means of the bolts 42 and are provided with semi-circular portions cooperating with the corresponding portions of the other parts 40 to clamp the fender braces and thereby rigidly secure the upper portions of the hood 25 in place. In order to provide a neat construction, the slots 37 are concealed by suitable brackets 43 having a vertically downwardly opening slot 44 therein adapted to receive the fender braces and having a laterally extending portion 45 adapted to be secured to that portion of the fender braces for normally receiving the head lamps. The latter in the present instance are transferred from the normal position on the fender brackets to a position in rear of the front bumpers as indicated by the reference character 46 in Figure 1.

Thus, from the foregoing it will be noted that I have provided means for protecting the vital parts of the front end of the vehicle from injury by projectiles in the form of armored plates which may be readily installed upon the vehicle without materially altering the construction of the latter. It will further be seen that the means for protecting the radiator unit is also designed to afford efficient cooling of the unit by permitting the free passage of air therethrough. It should also be understood that when equipping a vehicle with armor, as specified above, the windshield designated by the reference character 47 is preferably formed of bullet proof glass so as to protect the occupants of the vehicle.

What I claim as my invention is:

1. An armored vehicle having a radiator unit at the forward end thereof and means substantially enclosing the radiator unit comprising a metallic hood having a front substantially V-shaped wall inclined downwardly and forwardly from the top of the radiator unit and formed of a plurality of plates having the adjacent edges thereof arranged in overlapping relation and spaced laterally from each other to provide downwardly opening passages for the flow of air through the front wall aforesaid to the radiator unit.

2. An armored vehicle having a radiator unit at the forward end thereof and means substantially enclosing the radiator unit comprising a metallic hood having a front wall formed with concealed passages therein for the passage of air through the hood to the radiator unit, and means for attaching said hood to the frame and fender braces of a vehicle.

3. An armored vehicle having in combination, ground engaging wheels at the front end thereof equipped with pneumatic tires, a bumper in advance of the ground engaging wheels, and metallic plates carried by the bumper adjacent the opposite ends thereof for protecting the tires.

4. An armored vehicle having in combination, ground engaging wheels equipped with pneumatic tires, a bumper comprising spaced substantially parallel bars extending transversely of the vehicle in advance of the tires, a pair of bars having the outer ends thereof interposed between the ends of the parallel bars aforesaid for spacing the latter and having the inner ends secured to the bumper, and metallic plates secured to said members opposite the pneumatic tires for protecting the same.

5. An armored vehicle having a radiator unit at the front end thereof, a metallic hood substantially encasing the radiator unit and formed of side and front plates rigidly secured together, said side plates having rearwardly opening slots therein for receiving the fender braces extending from the radiator unit to the fenders, and means for securing said side plates to the braces.

6. An armored vehicle having a radiator unit at the front end thereof, a metallic hood substantially encasing the radiator unit and formed of side and front plates rigidly secured together, said side plates having rearwardly opening slots therein for receiving the fender braces extending from the radiator unit to the fenders, means for securing said side plates to the braces, and brackets secured to the braces at points exteriorly of the hood and having portions concealing the slots aforesaid.

7. An armored vehicle having a radiator unit at the front end thereof, a metallic hood substantially encasing the radiator unit and formed of side and front plates rigidly secured together, said side plates having rearwardly opening slots therein for receiving the fender braces extending outwardly from opposite sides of the radiator unit to the fenders and having lamp supporting portions intermediate the ends thereof, means for securing the side plates to the braces concealed by the hood, and brackets having portions secured to the head lamp receiving portions aforesaid of the brace and having other portions concealing the rearwardly opening slots aforesaid.

8. The combination with a motor vehicle having a substantially conventional front end construction comprising, a motor compartment, a hood for enclosing said compartment, a radiator in advance of the hood and fenders spaced upon opposite sides of the hood and extending over the front wheels of the vehicle, of an armored shield attachable to the vehicle in advance of the motor compartment and radiator for protecting the latter and having indirect passages therethrough for supplying air to the radiator and additional armored shields extending downwardly from the front ends of the fenders and positioned in advance of the wheels for protecting the latter.

In testimony whereof I affix my signature.

FRED LUKER.